April 13, 1926.
J. H. WAGENHORST
WHEEL
Filed Jan. 17, 1919
1,580,976
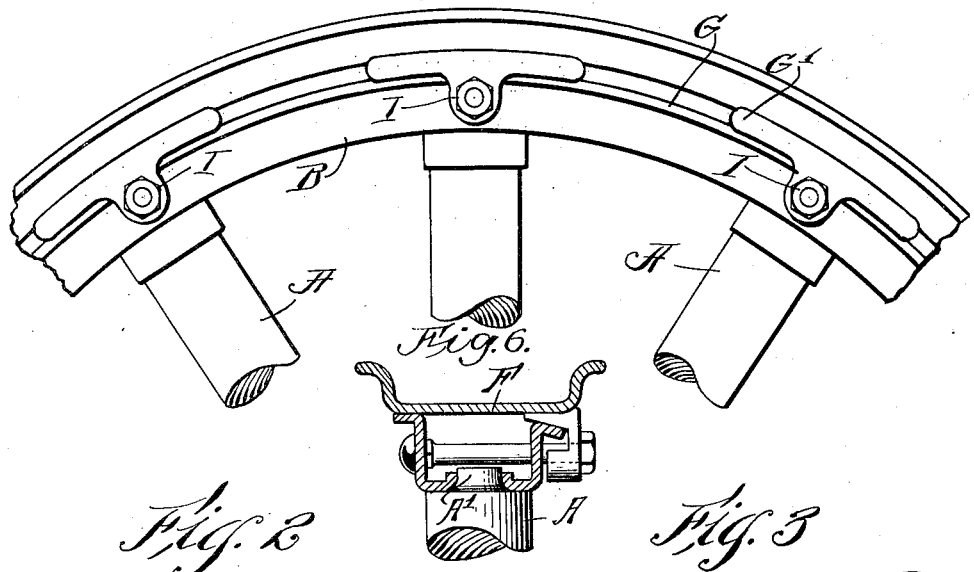
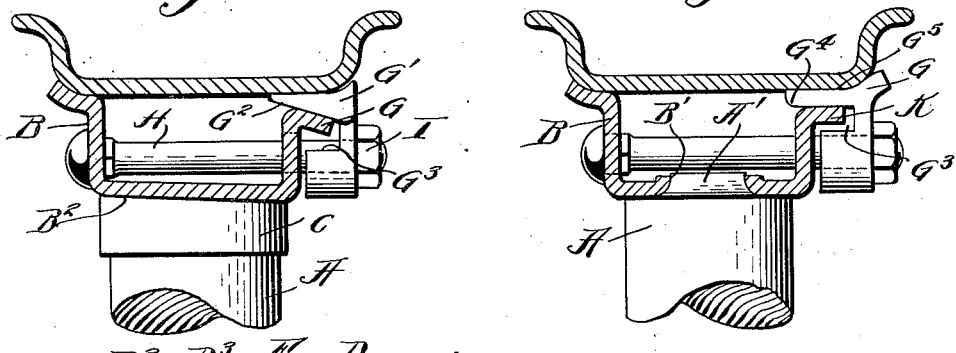
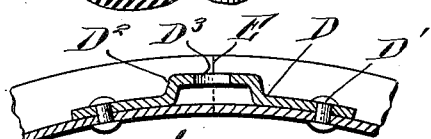
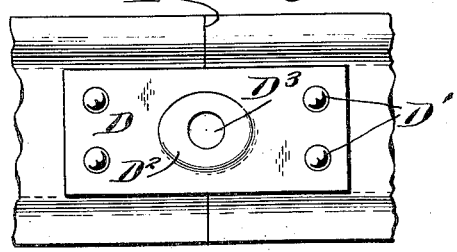
Inventor
J. H. Wagenhorst Patented Apr. 13, 1926.

1,580,976

UNITED STATES PATENT OFFICE.

JAMES H. WAGENHORST, OF AKRON, OHIO.

WHEEL.

Application filed January 17, 1919. Serial No. 271,583.

*To all whom it may concern:*

Be it known that I, JAMES H. WAGENHORST, a citizen of the United States, residing at Akron, in the county of Summit and State of Ohio, have invented a certain new and useful Improvement in Wheels, of which the following is a full, clear, and exact description, reference being had to the accompanying drawings.

This invention relates generally to wheels and more particularly to a wheel consisting of wooden spokes and a metallic fixed rim. The invention also has reference to a novel construction of demountable tire carrying rim together with means for fastening the same upon the fixed rim.

The objects of the invention are to provide a novel construction of connecting and driving plate in connection with the fixed rim and also provide a novel construction of demountable tire carrying rim and also novel means for securing a demountable rim upon a fixed rim.

With these various objects in view the invention consists in the novel features of construction and in the novel manner of combining or arranging them, all of which will be hereinafter fully described and pointed out in the claims.

In the drawings forming a part of this specification Fig. 1 is a view showing in elevation a portion of a wheel constructed in accordance with my invention having a demountable tire carrying rim applied thereto by means of fastening devices constructed in accordance with my invention; Fig. 2 is a transverse sectional view illustrating one form of fixed rim, demountable rim and means for securing the demountable rim to the fixed rim; Fig. 3 is a similar view showing a slight modification in the fixed rim and fastening means; Fig. 4 is a longitudinal sectional view of a portion of the fixed rim and showing the construction and arrangement of the combined connecting and driving plate; Fig. 5 is a detail plan view of the same; Fig. 6 is a sectional view showing still further modifications of the fixed rim and means for fastening the demountable tire carrying rim thereon.

In the practical embodiment of my invention I employ a plurality of wooden spokes A and a sheet metal fixed rim B. The inner ends of the spokes are tapered and shaped for contact with one another and at their outer ends they are intended to be brought into fixed engagement with the sheet metal fixed rim. This fixed engagement can be accomplished in several ways and in Figs. 3 and 6 I have shown the outer ends of the spokes as formed with a short tenon A' which is adapted to fit into a central aperture B' produced in the fixed rim, the metal being drawn outwardly when the perforation is made in order to provide a reenforcement for the spoke tenon and also provide a rounded edge for the fillet of the spoke tenon to fit against.

In Fig. 2 I have shown the spoke end provided with a cap C and this cap is formed with an inclined outer end adapted to engage the inclined base $B^2$ of the fixed rim or felly, this method of connection being shown and described in Letters Patent No. 1,480,034, issued Jan. 8, 1924, on my application Serial No. 262,649 filed November 15, 1918.

I have shown in connection with this wheel a fixed rim B which is transsplit or divided, the adjacent ends of this divided fixed rim being connected by a connecting plate D, the ends of which are riveted to the ends of the divided fixed rim at D'. This makes a very simple construction inasmuch as it eliminates the necessity for welding together the ends of the fixed rim in order to make a continuous circular channel member as has been the practice heretofore.

When the fixed rim is constructed for use in connection with a demountable tire carrying rim it will, of course, be necessary to provide some suitable means for receiving the driving lug of the tire carrying rim and with this object in view I provide a driving plate D which preferably bridges the division point E of the rim, the ends of said driving plate being rigidly secured to the fixed rim upon opposite sides of the division as indicated at D'. This connection can be made either by rivets or welding, and it will be noted that the central portion of the driving plate is elevated or bulged outwardly as shown at $D^2$ and apertured at $D^3$ to receive the driving lug. Inasmuch as it is necessary in most cases to unite the ends of the fixed rim either before or after it has been brought to true circular form, this driving plate connection provides a simple and efficient means for uniting the ends and also serves the purpose of the driving connection and this plate can be used either with or without welding the ends of the fixed rim or felly together. In Figs. 2, 3, and 6 I have shown the usual form of straight side tire carrying rim F and I have shown three different forms of fixed rims usable in connection with the said demountable tire carrying rim and in connection with said rim and felly I employ a novel form of clamp or wedge constructed according to the type of rim with which it is to be used. In Fig. 2, the outer side of the fixed rim is formed with an outwardly inclined flange G and the clamp or wedge G' has its inner face G² inclined to correspond with the inclination of the flange while its outer face is substantially straight and the inner face of the clamp is cut away as shown at G³ in order to receive the inclined flange during the inward movement of said clamp and inasmuch as the clamp rides outwardly upon the flange of the rim, the outer end of the bolt H will be carried outwardly with the clamp and consequently the bolt opening in the side of the rim is made sufficiently long to accommodate such movement. The usual type of nut I is applied to the end of the bolt for forcing the clamping wedge inwardly. In Fig. 3, the outer side of the fixed rim is formed with a flange K substantially straight and the clamping wedge G in this instance has its inner face G⁴ straight also while the outer face G⁵ is inclined to give the proper wedging action. The recess G³ in the inner side of the clamp in this instance is not quite so large as in the construction shown in Fig. 2 for the reason that the movement of the clamp is inwardly in a lateral direction only and does not have any radial outward movement, and furthermore in this instance the bolt will remain stationary and no elongation of the bolt hole will be necessary. The construction of clamp in Fig. 6 is the same as in Fig. 2, but it will be noted that in the construction of the fixed rim, the inner side is formed with a perfectly straight flange whereas in Fig. 2 there is a slight outward curve which serves as a stop.

It will be noted that the inner portions of the clamps G shown in Figs. 2, 3, and 6 are extended laterally so that they provide an extended bearing surface for engagement with the bolt H. It will also be noted that the inner portion of the clamp is out of engagement with the side wall of the felly. The force exerted by the nut I upon the clamp as the nut is screwed up meets with resistance due to the engagement of the upper portion of the clamp with the rim and this would tend to cause the clamp to tilt, but this tilting action is prevented by the extended bearing surface of the inner portion of the clamp which has an extended contact with the bolt so as to compel the clamp to move parallel to the axis of the bolt, thus preventing the tilting and fulcruming and causing the nut to exert its full pull upon the clamp as it is screwed up.

Having thus described my invention, what I claim is:—

1. In a wheel, a divided fixed rim, a plate connected to the ends of said rim, the central portion of said plate being outwardly upset, said upset portion being apertured to receive a driving lug.

2. In a wheel, the combination of a fixed rim, a demountable tire-carrying rim carried by said fixed rim, a plurality of rim-securing bolts extending transversely of the fixed rim, clamps arranged upon said bolts and engaging said demountable rim to secure the same upon the fixed rim, and nuts screwed on the bolts and engaging said clamps, each of said clamps having an enlarged inner portion presenting an extended bearing surface for the bolt to compel the clamp to move parallel to the axis of the bolt, whereby the full pull of the nut against the clamp is transmitted to the rim.

In testimony whereof, I hereunto affix my signature.

JAMES H. WAGENHORST.